US012678264B2

(12) United States Patent
Lv

(10) Patent No.: US 12,678,264 B2
(45) Date of Patent: Jul. 14, 2026

(54) ORTHODONTIC SELF-LOCKING BRACKET AND SYSTEM WITH CONTROLLABLE ARCH WIRE TORQUE

(71) Applicant: Tao Lv, Jinan (CN)

(72) Inventor: Tao Lv, Jinan (CN)

( * ) Notice: Subject to any disclaimer, the term of this patent is extended or adjusted under 35 U.S.C. 154(b) by 17 days.

(21) Appl. No.: 18/861,464

(22) PCT Filed: Mar. 22, 2023

(86) PCT No.: PCT/CN2023/083219
§ 371 (c)(1),
(2) Date: Oct. 29, 2024

(87) PCT Pub. No.: WO2023/213152
PCT Pub. Date: Nov. 9, 2023

(65) Prior Publication Data
US 2025/0281264 A1 Sep. 11, 2025

(30) Foreign Application Priority Data
May 6, 2022 (CN) .......................... 202210486111.2

(51) Int. Cl.
*A61C 7/14* (2006.01)
*A61C 7/30* (2006.01)
(52) U.S. Cl.
CPC . *A61C 7/14* (2013.01); *A61C 7/30* (2013.01)
(58) Field of Classification Search
CPC .. A61C 7/14; A61C 7/141; A61C 7/22; A61C 7/30
See application file for complete search history.

(56) References Cited

U.S. PATENT DOCUMENTS

| 5,890,893 | A | * | 4/1999 | Heiser | A61C 7/287 |
| | | | | | 433/14 |
| 5,971,753 | A | * | 10/1999 | Heiser | A61C 7/287 |
| | | | | | 433/14 |
| 6,582,226 | B2 | * | 6/2003 | Jordan | A61C 7/30 |
| | | | | | 433/10 |

(Continued)

FOREIGN PATENT DOCUMENTS

| CN | 104257430 A | 1/2015 |
| CN | 204106227 U | 1/2015 |

(Continued)

OTHER PUBLICATIONS

Jun. 29, 2023 International Search Report issued in International Patent Application No. PCT/CN2023/083219.

*Primary Examiner* — Ralph A Lewis
(74) *Attorney, Agent, or Firm* — Oliff PLC

(57) ABSTRACT

An orthodontic self-locking bracket with a controllable arch wire torque, including a bracket body and an elastic member, wherein a groove is provided in the bracket body, and a self-locking cover plate is disposed on an upper part of the groove; the elastic member is connected to a side wall of the groove; the elastic member and another side wall of the groove are configured to dispose an arch wire; the elastic member is capable of elastically deforming under a squeezing action of the arch wire; and the elastic member is capable of elastically deforming on a part close to a bottom surface of the groove and a part away from the bottom surface of the groove, to elastically act on the arch wire at different twist angles.

14 Claims, 13 Drawing Sheets

(56) References Cited

U.S. PATENT DOCUMENTS

| 12,364,578 B2 * | 7/2025 | Zhang | A61C 7/14 |
| 2002/0197581 A1 * | 12/2002 | Georgakis | A61C 7/28 433/10 |
| 2005/0244780 A1 | 11/2005 | Abels et al. | |
| 2008/0199825 A1 * | 8/2008 | Jahn | A61C 7/30 433/11 |
| 2015/0272706 A1 * | 10/2015 | Tan | A61C 7/28 433/8 |
| 2021/0068929 A1 | 3/2021 | Norris | |
| 2024/0041566 A1 * | 2/2024 | Lv | A61C 7/143 |
| 2025/0032224 A1 * | 1/2025 | Xu | A61C 7/22 |
| 2025/0281264 A1 * | 9/2025 | Lv | A61C 7/14 |

FOREIGN PATENT DOCUMENTS

| CN | 113331972 A | 9/2021 |
| CN | 113659084 A | 11/2021 |
| CN | 114902441 A | 8/2022 |
| CN | 115006021 A | 9/2022 |
| CN | 217593097 U | 10/2022 |

* cited by examiner

[FIG. 1]
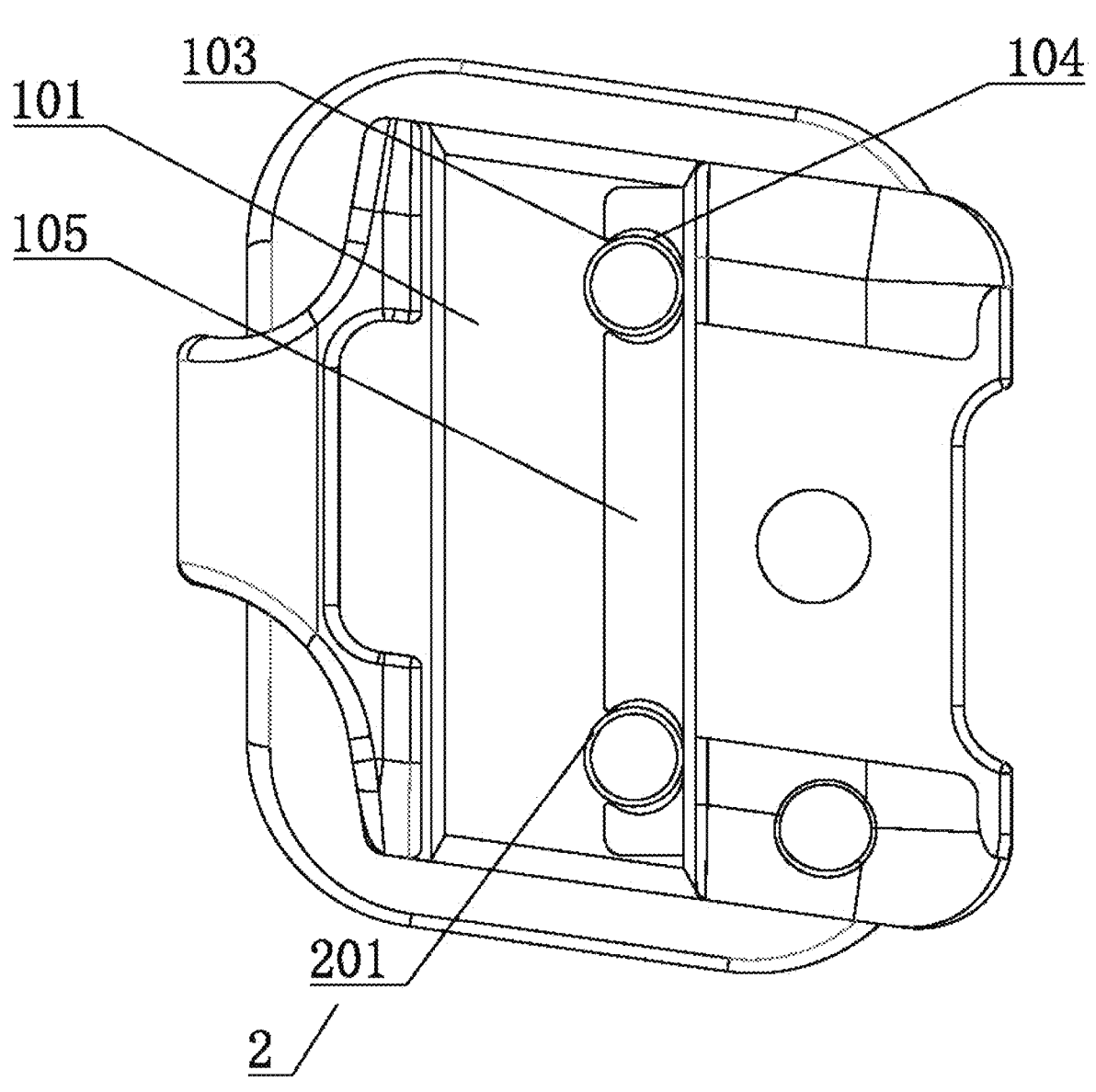

[FIG. 2]
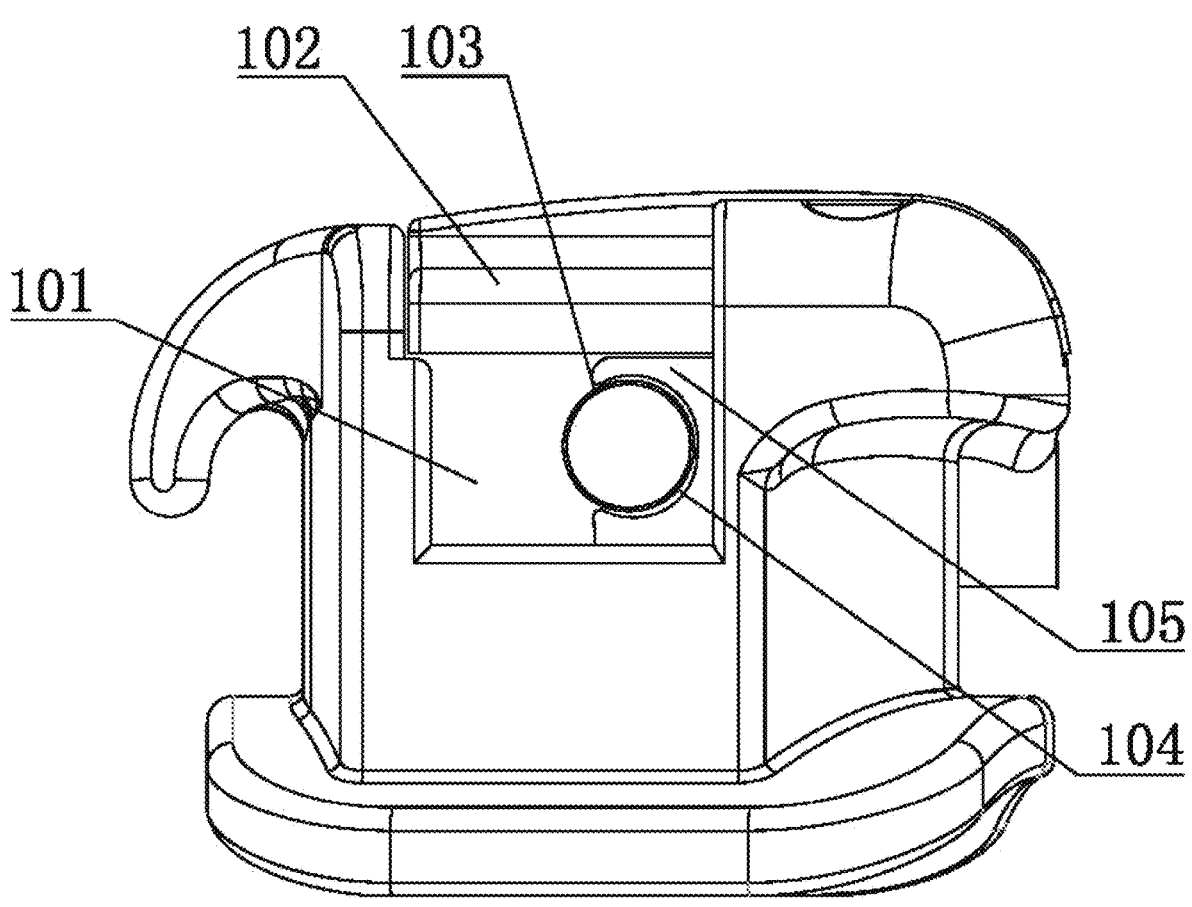

[FIG. 3]
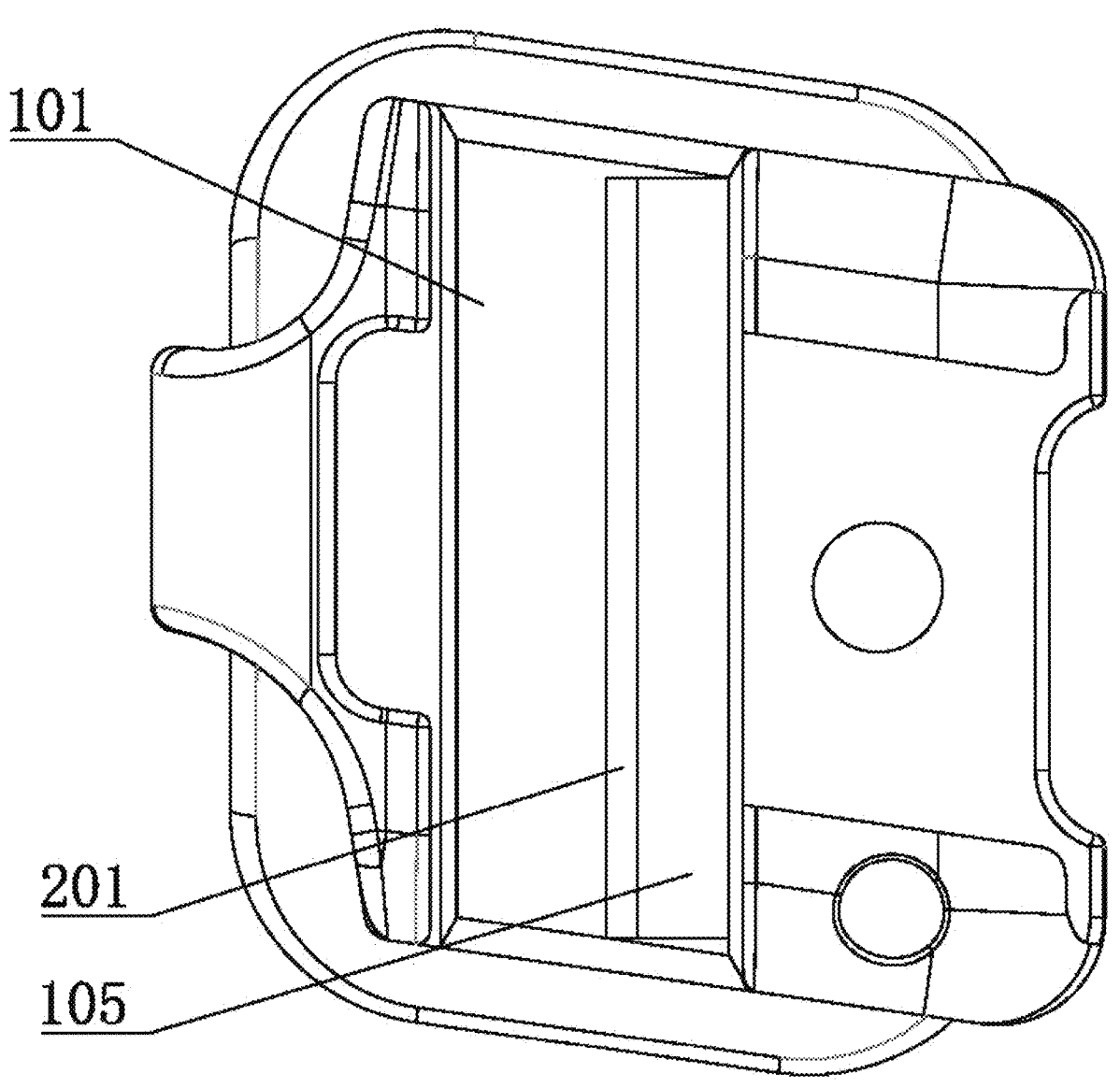
101
201
105

[FIG. 4]
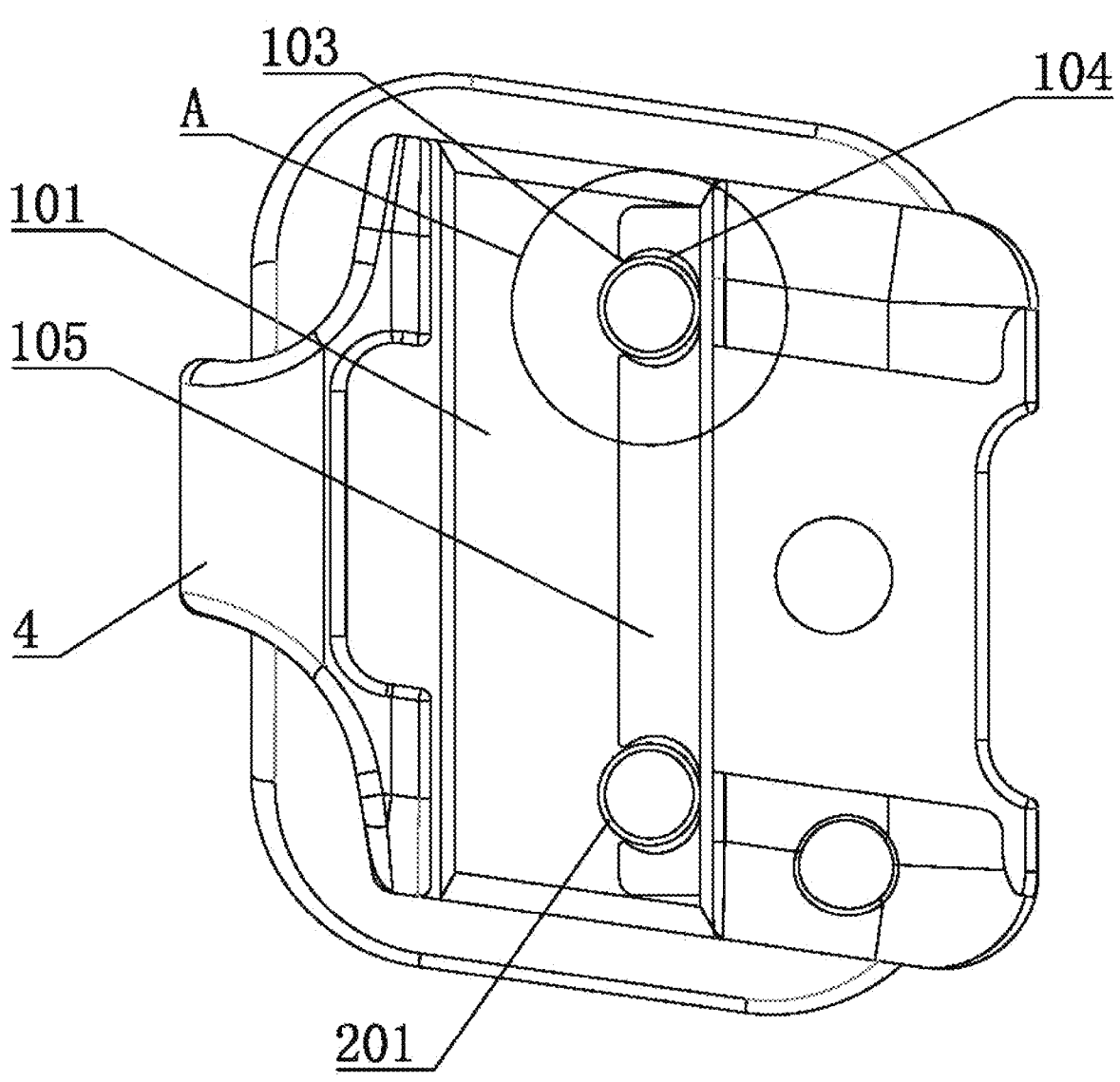

[FIG. 5]
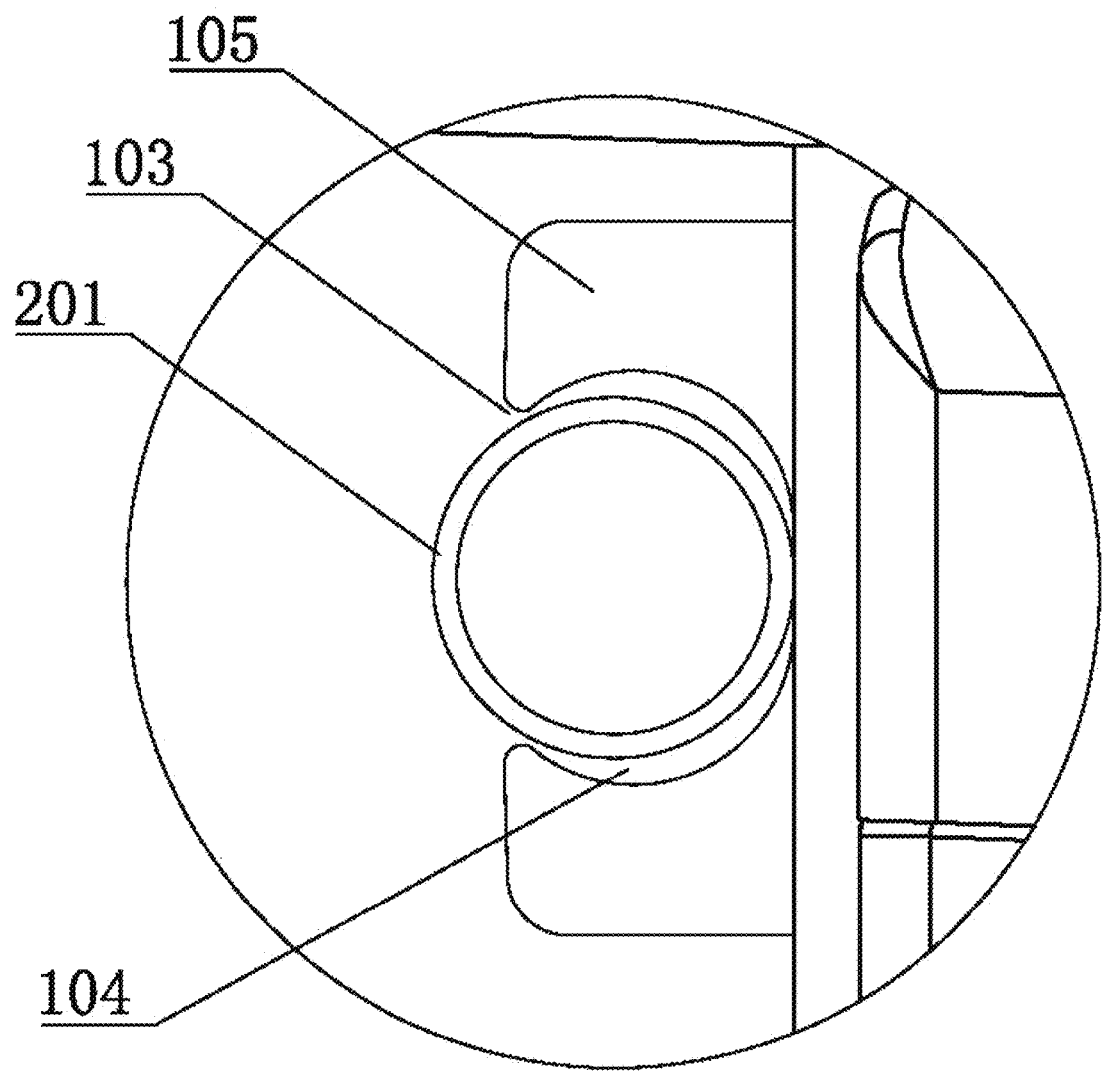

[FIG. 6]
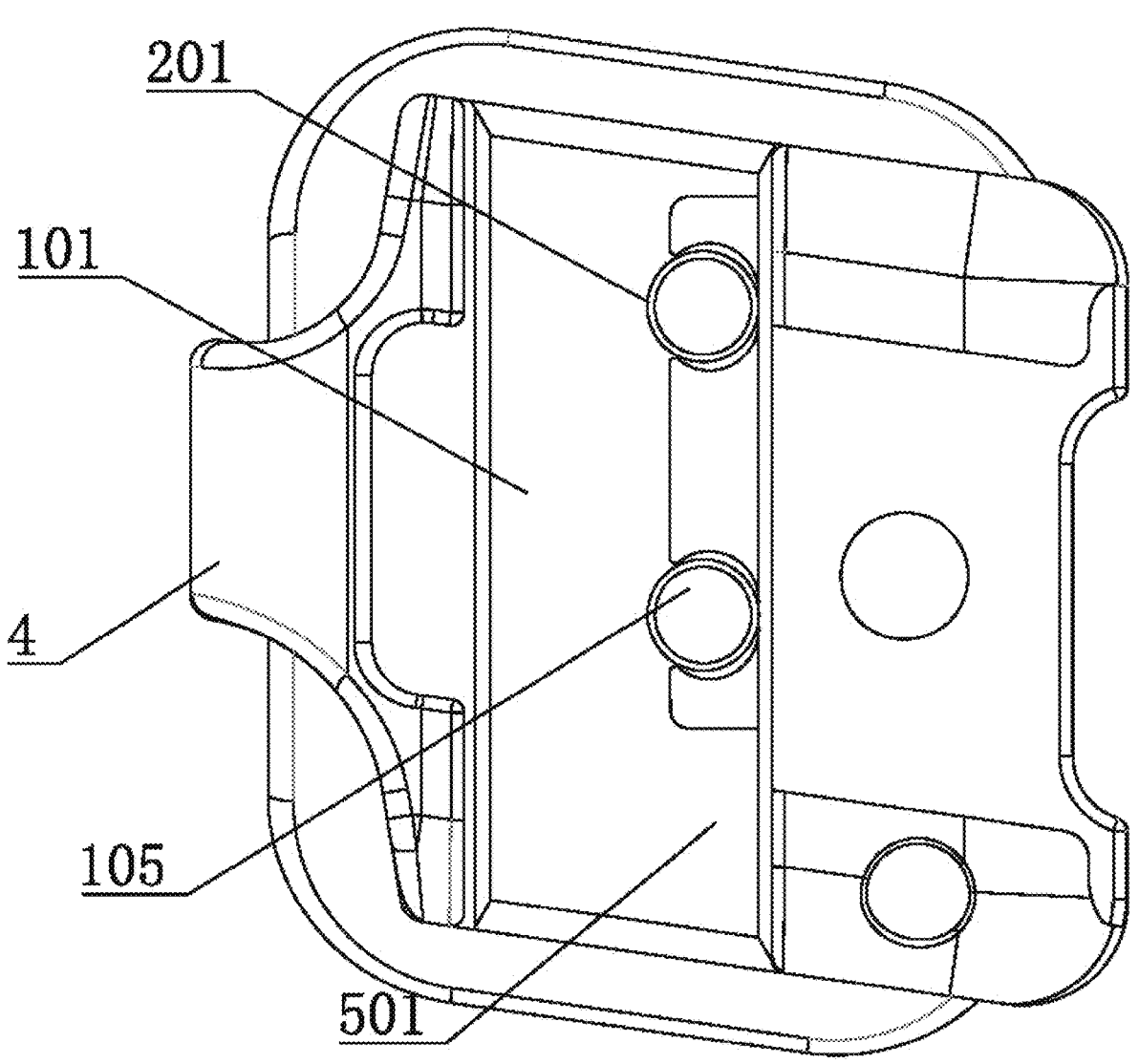

[FIG. 7]
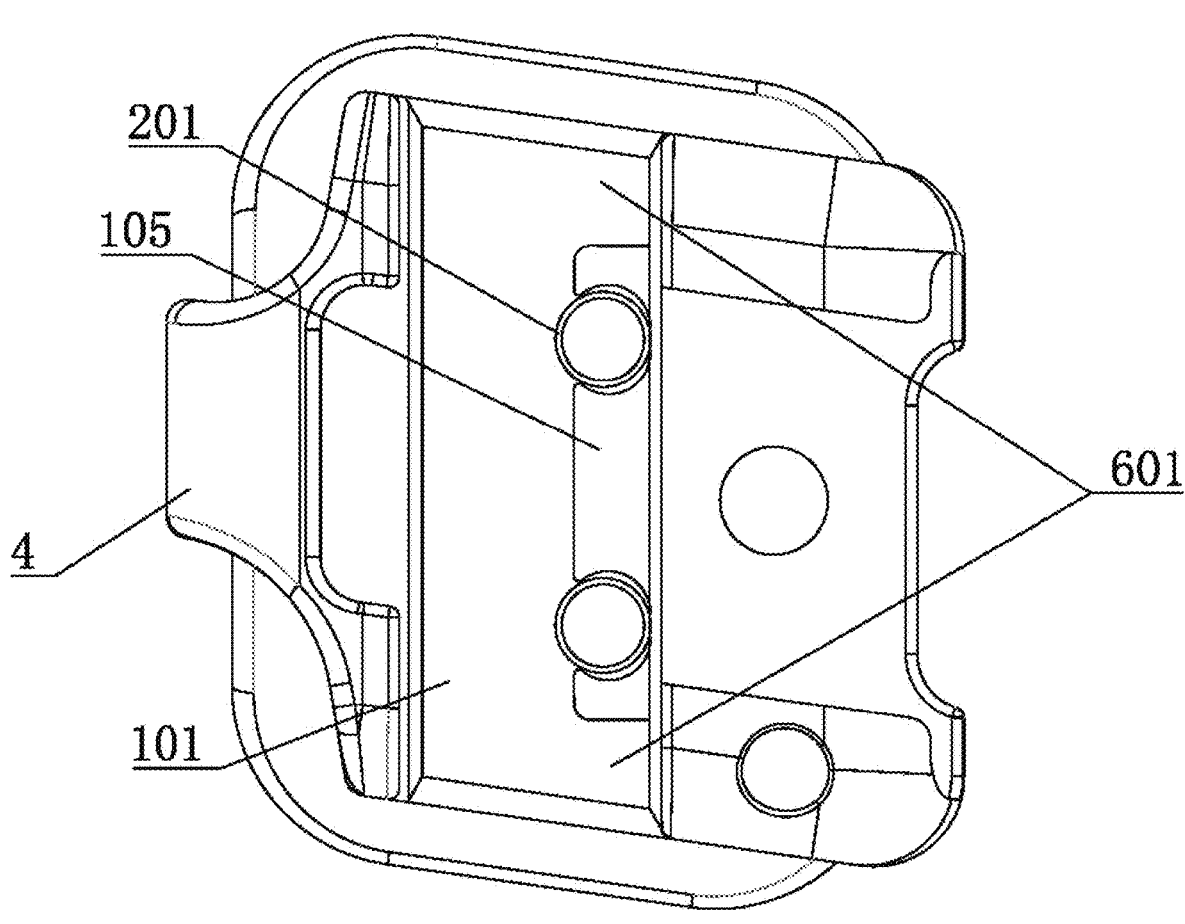

[FIG. 8]
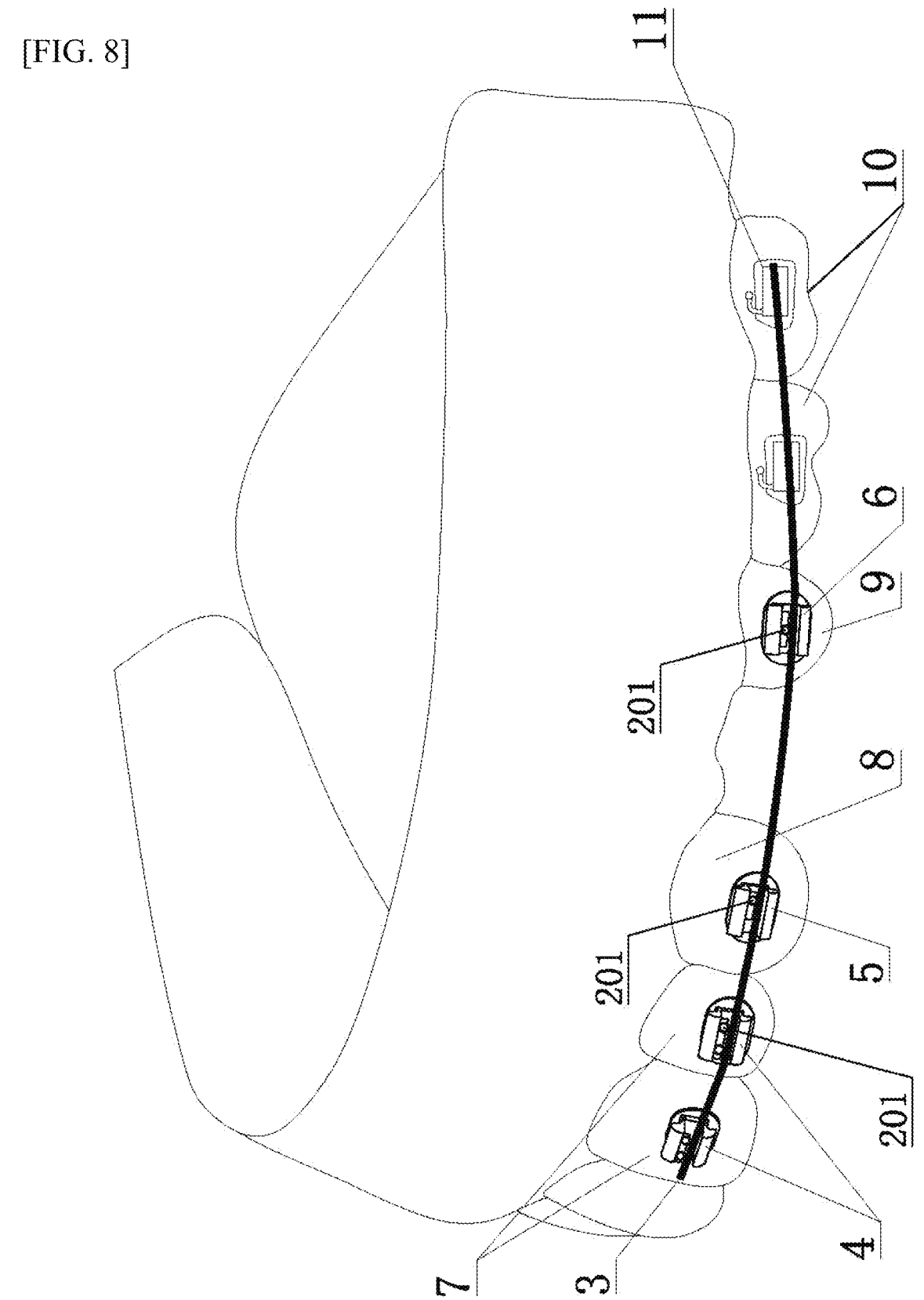

[FIG. 9]
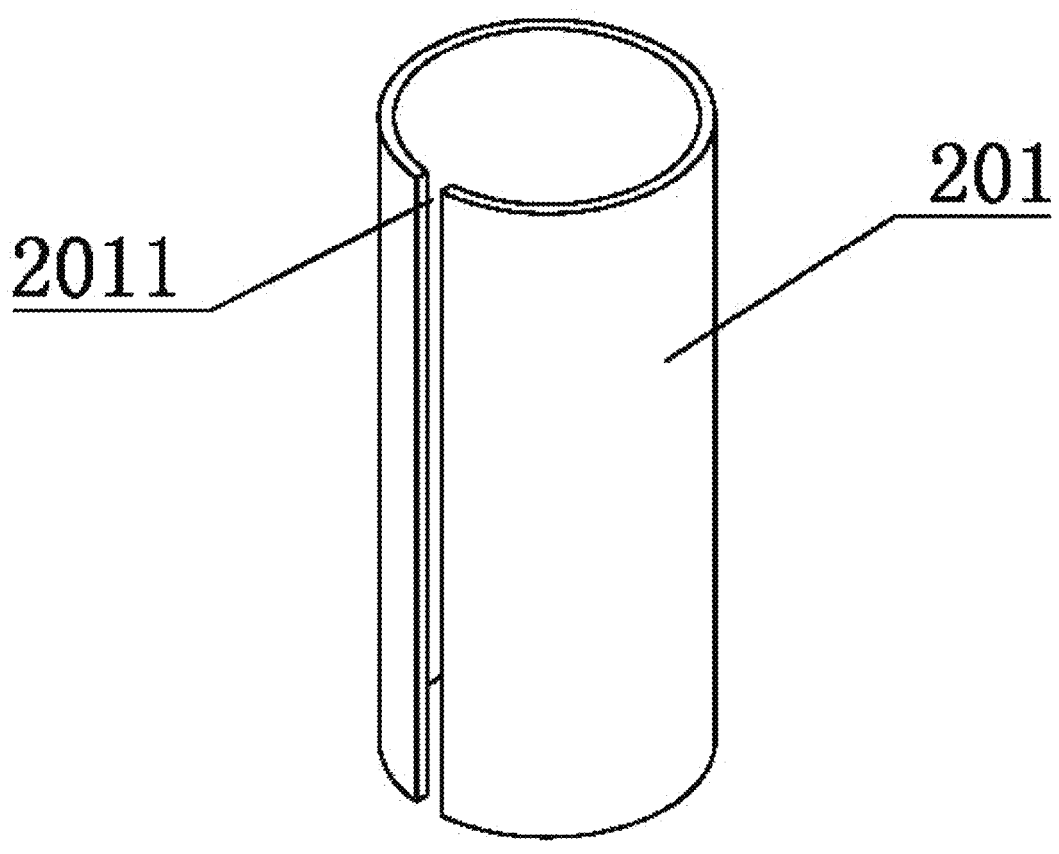
2011
201

[FIG. 10]
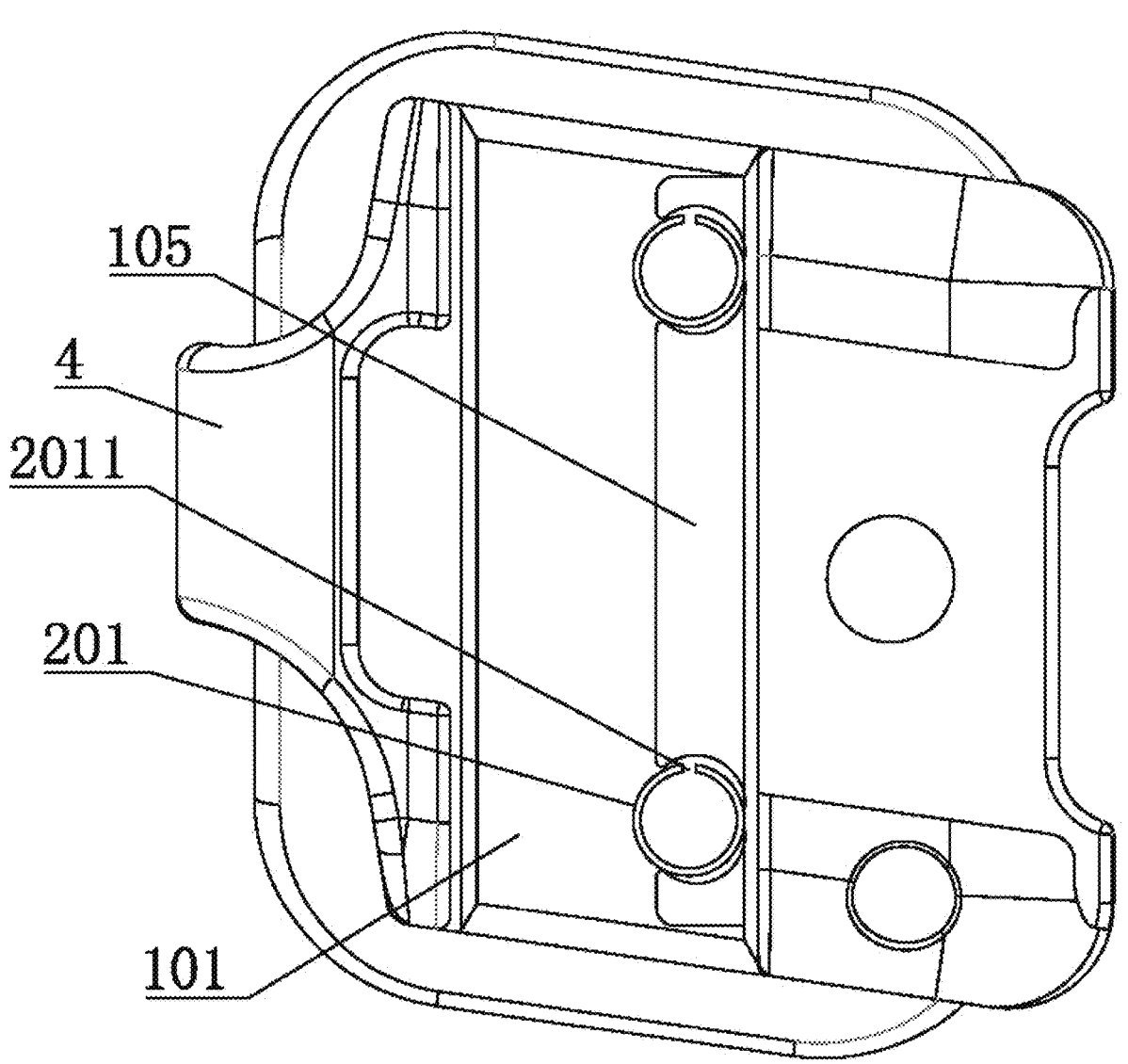

[FIG. 11]
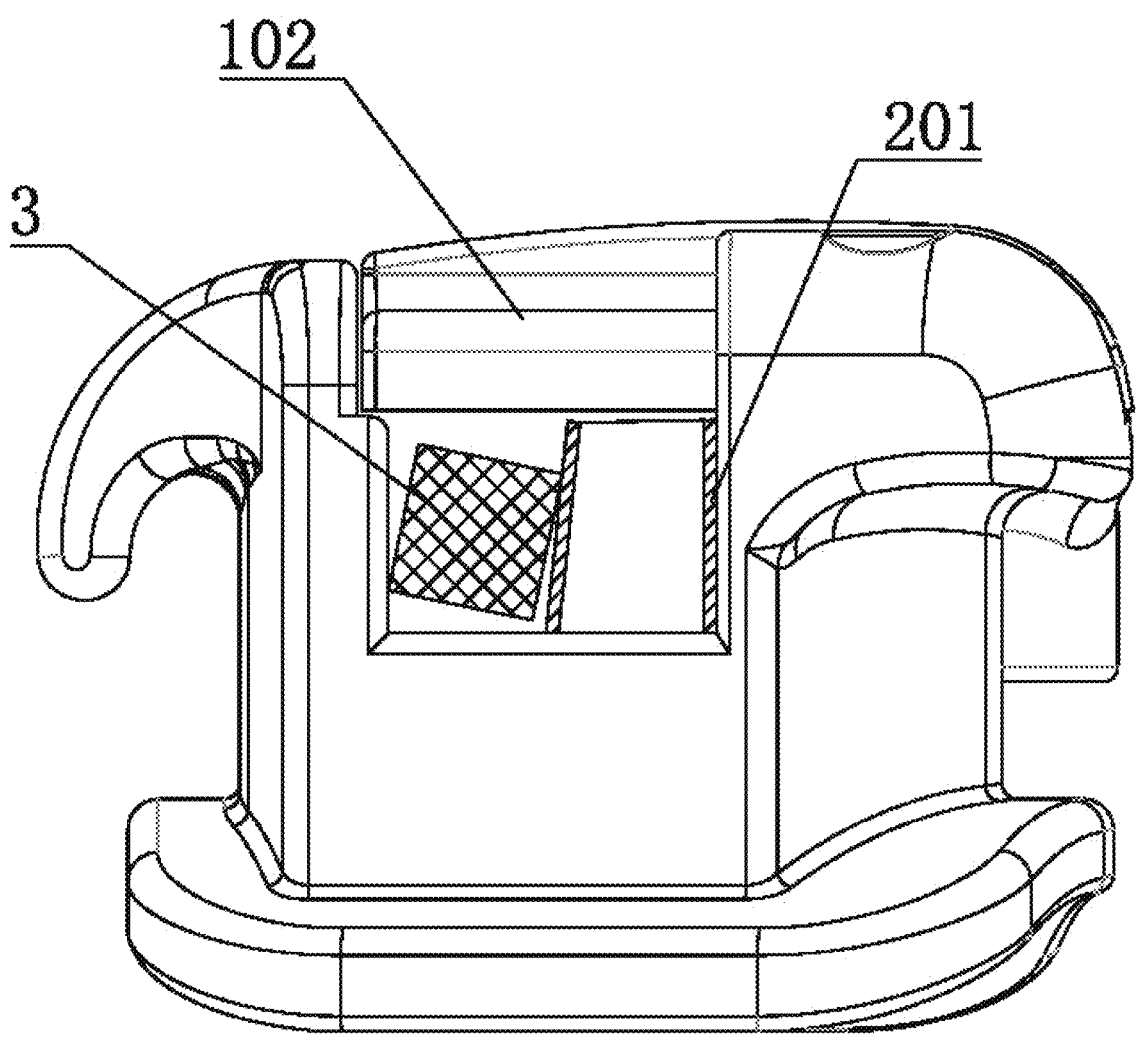

[FIG. 12]
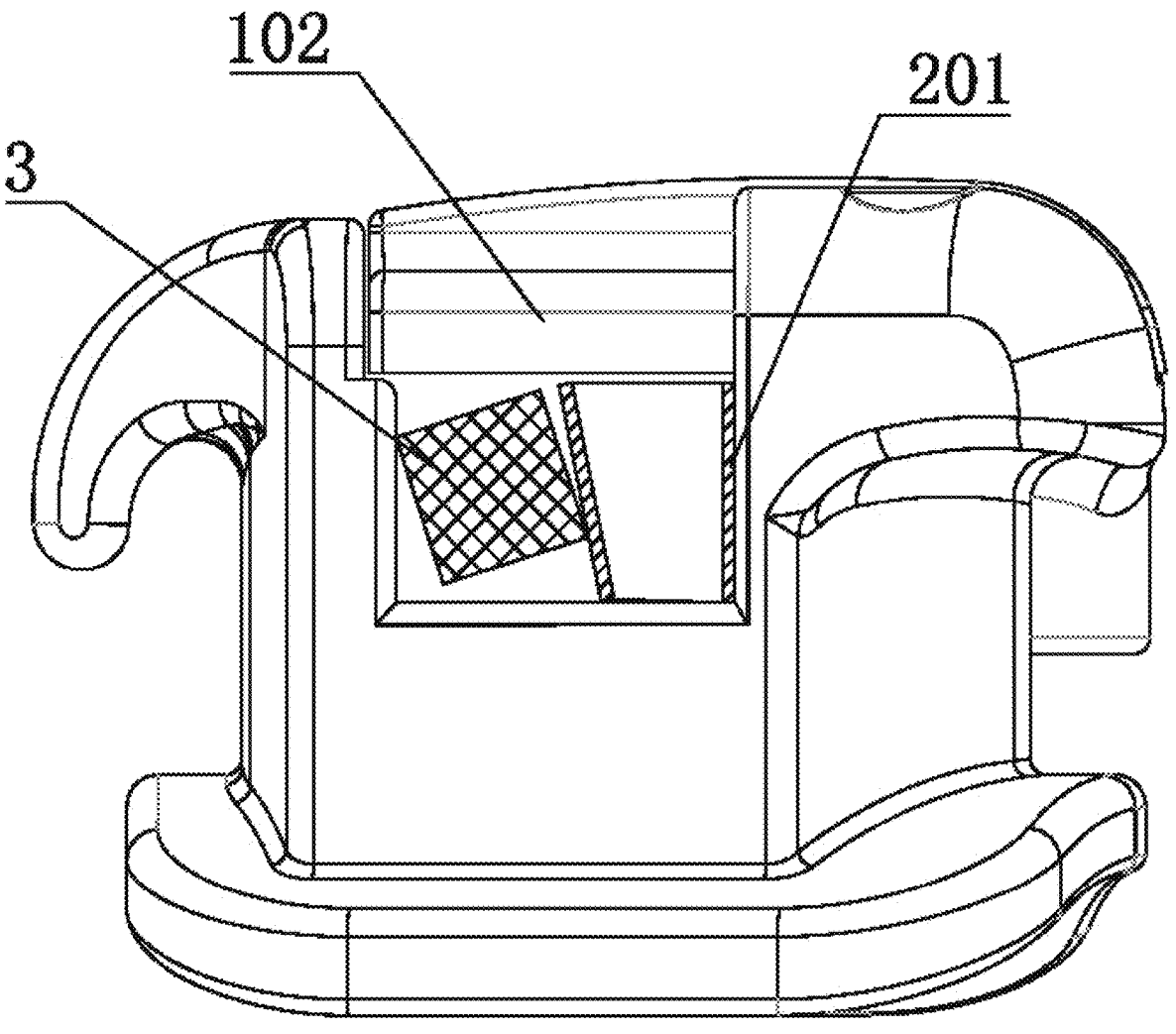

[FIG. 13]
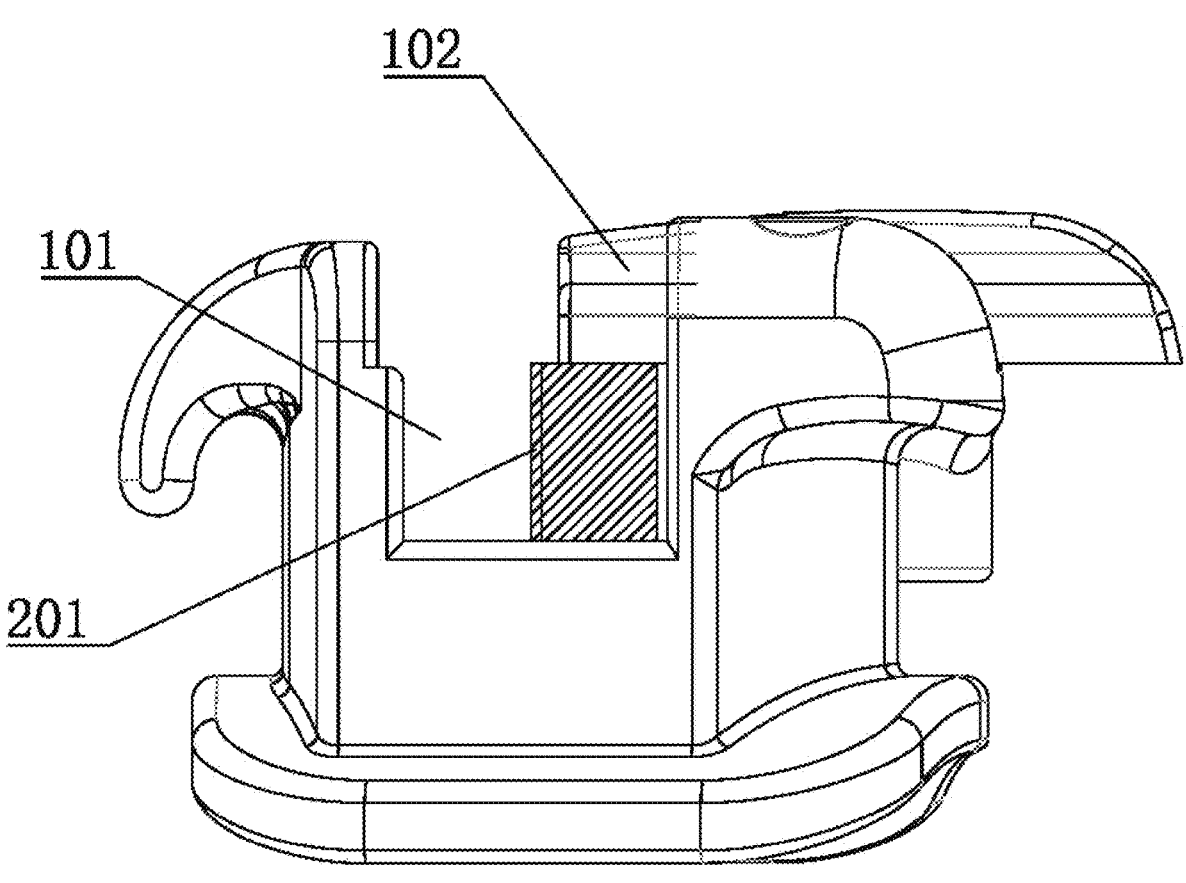

ORTHODONTIC SELF-LOCKING BRACKET AND SYSTEM WITH CONTROLLABLE ARCH WIRE TORQUE

TECHNICAL FIELD

The present invention relates to an orthodontic self-locking bracket and system with a controllable arch wire torque.

BACKGROUND

An orthodontic self-locking bracket for a tooth has the advantages of being convenient and efficient in clinical operation, gentle in orthodontic force, quick in tooth movement and the like as a friction force between a groove of the bracket and an arch wire is reduced by replacing a conventional ligaturing operation with a self-locking structure of the bracket.

The orthodontic treatment can be roughly divided into two stages according to a thickness of the used arch wire. At a first stage, teeth are aligned and levelled by using the arch wire to act on the grooves of the tooth brackets at an early stage. At a second stage, a thick arch wire is used to control the tooth root, so that the tooth has an ideal torque, axis inclination and position, and is functional and aesthetic. However, the self-locking bracket in the prior art has the following disadvantages: When the self-locking bracket uses a thick arch wire, the thick arch wire is disposed in a groove of the bracket, and a size of the thick arch wire should be less than a size of the groove (as it is difficult for put a full-size arch wire in the groove or an orthodontic force is excessively large). This leads to an unavoidable clearance between an inner wall of the groove and the thick arch wire. The clearance cannot be eliminated even there is an elastic self-locking cover plate, and therefore, precise expression of preset data of the bracket is directly affected, and an orthodontic treatment course and an orthodontic treatment effect are affected. In addition, when the thick arch wire is used to control the tooth root, an ideal torque needs to be obtained through twisting. However, when the current self-locking bracket is matched with the arch wire for use, as positions, angles and the like of a plurality of self-locking brackets have various differential changes, it is difficult for a doctor to precisely control the final torque of the arch wire during twisting. An excessively large torque easily leads to an irreversible damage to the tooth, and consequently, problems such as tooth root shortening due to absorption, tooth loosening, and the like are caused after the orthodontic treatment. Ideal tooth movement cannot be achieved with an excessively small torque, and therefore, the orthodontic treatment course is prolonged and even an ideal orthodontic target cannot be achieved.

SUMMARY

The present invention provides an orthodontic self-locking bracket and system with a controllable arch wire torque, which is reasonable in structural design. A brand-new elastic member structure is disposed in a groove of the self-locking bracket, to replace and change a problem of torque control on a rigid groove and a rigid arch wire of a self-locking bracket in the prior art, so that a problem that stress on the tooth root is excessively concentrated during torque control on the arch wire at different twist angles is radically resolved, a torque couple of the arch wire is gently expressed, an adsorption risk of the tooth root in an orthodontic process is greatly reduced, a damage to the tooth in the orthodontic process is avoided and eliminated, use in an clinical operation of a doctor is more convenient and efficient, and the problem in the prior art is resolved.

To resolve the technical problem, the present invention adopts the following technical solution: An orthodontic self-locking bracket with a controllable arch wire torque includes a bracket body and an elastic member, where a groove is provided in the bracket body, and a self-locking cover plate is disposed on an upper part of the groove; the elastic member is connected to a side wall of the groove; the elastic member and another side wall of the groove are configured to dispose an arch wire; the elastic member is capable of elastically deforming under a squeezing action of the arch wire; and the elastic member is capable of elastically deforming on a part close to a bottom surface of the groove and a part away from the bottom surface of the groove, to elastically act on the arch wire at different twist angles. In this solution, the elastic member is designed to completely replace and change a problem of torque control on a rigid groove and a rigid arch wire of the self-locking bracket in the prior art, elastic control (as one side of the groove has elasticity) on a multi-angle torque of the arch wire is implemented, a problem that stress on the tooth root is excessively concentrated during torque control on the arch wire at different twist angles is radically resolved, a torque couple of the arch wire is gently expressed, an adsorption risk of the tooth root in an orthodontic process is greatly reduced, the tooth truly achieves an ideal torque, axial inclination, and position, orthodontic treatment is safe and efficient, a damage to the tooth in the orthodontic process is avoided and eliminated, and use in an clinical operation of a doctor is more convenient and efficient.

Further, the elastic member is an elastic tube, the elastic tube is connected to the side wall of the groove, and the elastic tube is capable of elastically deforming under squeezing of the arch wire. In this solution, the characteristic of a tubular structure can be utilized to achieve elastic deformation after squeezing, and the tubular structure is more stable and reliable, so that elastic restorability is stronger, and an elastic control capability on the arch wire is stronger.

Further, a clamping groove is provided on the side wall of the groove, and the clamping groove fits the elastic tube, so that an outer side wall of the elastic tube is protruded from the clamping groove; and a deformation gap is provided between an inner wall of the clamping groove and the elastic tube, and the deformation gap is used for allowing the elastic tube to deform. In the solution in which the clamping groove is designed on the side wall of the groove for mounting the elastic tube in a fitting manner, the entire structure is simpler to produce and assemble, easier to implement, and controllable in cost. In addition, the position of the elastic tube can be kept to not change due to squeezing of the arch wire, and is always kept inside the clamping groove, to ensure an effective elastic effect and control on the arch wire.

Further, an axial direction of the elastic tube is perpendicular to the bottom surface of the groove, and there is at least one elastic tube in a direction parallel to the bottom surface of the groove. The axial direction of the elastic tube is perpendicular to the bottom surface of the groove, so that the elastic deformation characteristic of any axial position of the elastic tube can be sufficiently used to achieve torque control on the arch wire at any angle. When the arch wire twists at a clockwise or anticlockwise angle, the elastic tube can be squeezed by the arch wire to deform, so as to control an elastic acting force.

Further, there are two elastic tubes which are distributed at two ends in the direction parallel to the bottom surface of the groove. In this solution, the two elastic tubes can adapt to a functional need of the self-locking bracket corresponding to an incisor, so that the arch wire can be elastically controlled on opening positions on the two sides of the groove to adapt to a torque change, on the incisor, of the arch wire.

Further, the axial direction of the elastic tube is parallel to the bottom surface of the groove, and there is at least one elastic tube in a direction perpendicular to the bottom surface of the groove. This solution is an alternative solution in which the axial direction of the elastic tube is perpendicular to the bottom surface of the groove. In this solution, the axial direction of the elastic tube is parallel to the bottom surface of the groove, so that an elastic force control effect on the elastic tube can still be achieved, which may be lower in practical use, but is higher than that in the prior art. Therefore, a better elastic control capability can be achieved.

Further, there are two elastic tubes in the direction perpendicular to the bottom surface of the groove, and the two elastic tubes are distributed at two ends in the direction perpendicular to the bottom surface of the groove. Similarly, the two elastic tubes disposed in this solution can adapt to the functional need of the self-locking bracket corresponding to the incisor, so that the arch wire can be elastically controlled on opening positions on the two sides of the groove to adapt to a torque change, on the incisor, of the arch wire.

Further, a fixing part is integrally formed on the side wall of the groove, and the fixing part is provided with the clamping groove. The fixing part in this solution is different from the self-locking bracket structure in the prior art, is a brand-new structural design, and is easy to produce. The clamping groove is provided on the fixing part, so that the arch wire can be stably mounted, and the structure is reasonable.

Further, the fixing part is integrally disposed, and the two ends of the fixing part do not exceed two side end surfaces of the groove in the direction parallel to the bottom surface of the groove. In this solution, the fixing part can completely fit the elastic tube to ensure that the elastic tube can have an elastic acting force on the arch wire, and therefore, the two ends of the fixing part need to be ensured to not exceed two side end surfaces of the groove. In addition, when there are two or more elastic tubes, the fixing part can be disposed as an integrated structure, and is disposed on the side wall of the entire groove. Alternatively, the fixing part may be disposed as a split structure, is disposed corresponding to the elastic tubes, and is distributed on the side wall of the groove.

Further, the elastic tube is provided with a cutting seam, and the cutting seam is used to increase an elastic deformation capability of the elastic tube. The cutting seam is designed for making the elastic tube to have a stronger deformation capability. After the elastic tube is squeezed by the arch wire, the cutting seam can provide more deformation space, so that the elastic tube has a greater elastic control range, and stronger adaptability.

Further, the elastic tube is a circular elastic tube. The circular tube structure is more stable and controllable, and is easier to process, produce, and mount.

An orthodontic self-locking bracket system with a controllable arch wire torque includes the elastic tube and further includes a plurality of brackets, where a groove is provided in the bracket, an elastic tube is disposed in the groove, and the bracket includes a first bracket, a second bracket, and a third bracket;

there are two elastic tubes of the first bracket in a direction perpendicular to a bottom surface of the groove, and the two elastic tubes are distributed on two sides in a direction parallel to the bottom surface of the groove;

there is one elastic tube of the second bracket in the direction perpendicular to the bottom surface of the groove, and the one elastic tube is distributed on one side of the groove in the direction parallel to the bottom surface of the groove;

there is one elastic tube of the third bracket in the direction perpendicular to the bottom surface of the groove, and the one elastic tube is distributed in the middle of the groove in the direction parallel to the bottom surface of the groove; and the first bracket is disposed on an incisor, the second bracket is disposed on a canine, the third bracket is disposed on a front molar, and the first bracket, the second bracket, and the third bracket are matched with each other, so that the arch wire generates different orthodontic forces corresponding to different tooth parts.

In this solution, the first bracket is mounted on the incisor, the second bracket is mounted on the canine, and the third bracket is mounted on the front molar. Elastic tubes of the first bracket, the second bracket, and the third bracket are delicately and differently disposed, so that the arch wire of the bracket system can generate different orthodontic forces on positions corresponding to different brackets, and therefore, torque applying on the incisor does not need to be very precise. The elastic tube of the first bracket can ensure slow release of stress to avoid a negative effect as the stress in a root apex area is excessively absorbed. The second bracket provides a movement clearance for the arch wire to approach to one side of the incisor, and therefore, deep overbite of the incisor due to an axis of the canine is not easily caused. Empty positions on two sides of the elastic tube of the third bracket can provide a movement clearance for the arch wire, so that the front molar is unlikely to have mesial inclination to lead to an anchorage loss. When a chair arch wire is added, a friction force between the chair arch wire and the third bracket also can be reduced, to avoid a case in which an unrelated tooth moves due to an excessively large orthodontic force.

It should be noted that, although the orthodontic self-locking bracket system in this solution is applied to an upper-jaw tooth according to the drawings, a person of skill in the field can know that the system is also applicable to a low-jaw tooth. When the orthodontic self-locking bracket system in this solution is applied to the low-jaw tooth, the bracket disposed on the low-jaw incisor may be the first bracket as the low-jaw incisor is smaller than the upper-jaw incisor. Alternatively, the current bracket structure without an elastic tube structure be adopted. The bracket can be flexibly selected according to different orthodontic needs of the low-jaw tooth.

Further, the second bracket is disposed on the canine, and the side of the groove without an elastic tube is disposed facing the incisor for the arch wire to move. A movement clearance is provided for the side of the arch wire facing the incisor according to the structural change of the second bracket, so that an extra pulling force of the arch wire on the incisor is reduced, and a downwards ineffective pulling force of the arch wire on the incisor can be timely eliminated. This prevents the incisor from being pulled outwards, and avoids overbite of the incisor.

Further, there are two front molars on a same side of the tooth. After one front molar is extracted, the third bracket is disposed on the other front molar that is not extracted. The empty positions on two sides of the elastic tube of the third bracket are used to reduce a friction force generated between the chair arch wire and the third bracket. In this embodiment, during tooth extraction, the front molar is firstly extracted to form a gap through which a dentition is aligned and an anterior tooth is retracted. Therefore, after one front molar is extracted, the chair arch wire is added into the groove of the orthodontic bracket. The chair arch wire refers to a special arch wire form that is added at a dental suture stage in the dental orthodontic field. The arch wire may be bent to pull and move teeth on the two sides of a gap between teeth. The empty positions on the two sides of the elastic tube of the third bracket provide movement clearances for the chair arch wire, so that an invalid friction force generated between the bent position of the chair arch wire and the third bracket can be effectively reduced, the orthodontic force generated by the arch wire of the entire system is reduced, and the unrelated tooth is prevented from moving.

Further, the fixing part of the first bracket can be continuously and integrally disposed along the side wall of the groove.

Further, the second bracket is provided with a single-sided notch. The single-sided notch corresponds to a side wall of the groove not filled up with the fixing part. To prevent the arch wire in the second bracket from losing the original orthodontic force, a maximum size of the single-sided notch 501 is limited: in a length direction of the groove, the size of the single-sided notch of the second bracket is less than or equal to 60% of a length size of the entire groove.

Further, the third bracket is provided with a double-sided notch. The double-sided notch corresponds to a side wall of the groove not filled up with the fixing part. To prevent the arch wire from losing the original orthodontic force due to the excessively large size of the double-sided notch 601 of the third bracket 6, a maximum size of the double-sided notch 601 is limited: in the length direction of the groove, the size of any double-sided notch is less than or equal to 30% of a length size of the entire groove.

Further, to avoid a case in which the friction force cannot be reduced as the movement clearance of the arch wire is insufficient due to an excessively small size of the single-sided notch 501 of the second bracket 5, a minimum size of the single-sided notch 501 is limited: in the length direction of the groove, the size of the single-sided notch 501 of the second bracket 5 is greater than 10% of the size of the entire groove.

Further, to avoid a case in which the friction force cannot be reduced as the movement clearance of the arch wire is insufficient due to an excessively small size of the double-sided notch 601 of the third bracket 6, a minimum size of the double-sided notch 601 is limited: in the length direction of the groove, the size of any doubled-sided notch 601 is greater than 5% of the size of the entire groove.

With adoption of the foregoing structure, the present invention has the beneficial effects: a problem of torque control on a rigid groove and a rigid arch wire of the self-locking bracket in the prior art is completely replaced and changed, elastic control (as one side of the groove has elasticity) on a multi-angle torque of the arch wire is implemented, a problem that stress on the tooth root is excessively concentrated during torque control on the arch wire at different twist angles is radically resolved, a torque couple of the arch wire is gently expressed, the orthodontic treatment is more convenient and efficient, and the tooth is likely to obtain ideal torque, axis inclination, and position.

BRIEF DESCRIPTION OF DRAWINGS

FIG. 1 is a schematic diagram of a top-view structure according to an implementation of the present invention;

FIG. 2 is a schematic diagram of a side-view structure according to another implementation of the present invention;

FIG. 3 is a schematic diagram of a top-view structure according to an implementation in FIG. 2;

FIG. 4 is a schematic diagram of a top-view structure of a first bracket according to the present invention;

FIG. 5 is a schematic diagram of a partial enlarged structure of a part A in FIG. 4;

FIG. 6 is a schematic diagram of a top-view structure of a second bracket according to the present invention;

FIG. 7 is a schematic diagram of a top-view structure of a third bracket according to the present invention;

FIG. 8 is a schematic diagram of a structure of a self-locking bracket system according to the present invention;

FIG. 9 is a schematic diagram of a preferable structure of an elastic tube according to the present invention;

FIG. 10 is a schematic diagram of a structure in which the elastic tube in FIG. 9 is used in a bracket;

FIG. 11 is a schematic diagram of a structure in a state in which an arch wire clockwise twists relative to a screen;

FIG. 12 is a schematic diagram of a structure in a state in which an arch wire anticlockwise twists relative to a screen; and FIG. 13 is a schematic diagram of a structure of a self-locking cover plate in an open state.

In the figures:

1, bracket body; 101, groove; 102, self-locking cover plate; 103, clamping groove; 104, deformation gap; 105, fixing part;

2, elastic member; 201, elastic tube; 2011, cutting seam;

3, arch wire;

4, first bracket; 5, second bracket; 501, single-sided notch; 6, third bracket; 601, double-sided notch; 7, incisor; 8, canine; 9, front molar; 10, molar; and 11, buccal tube.

DETAILED DESCRIPTION OF THE EMBODIMENTS

To clearly describe the technical characteristics of the solution, the following describes the present invention in detail in specific implementations with reference to the drawings thereof.

In the following description, a plurality of specific details are described for full understanding of this application, and the application may be further implemented in other implementations different from those described herein, and therefore, a protection range of the application shall not be limited by specific embodiments disclosed below.

As shown in FIG. 1 to FIG. 13, an orthodontic self-locking bracket with a controllable arch wire torque includes a bracket body 1 and an elastic member 2, where a groove 101 is provided in the bracket body 1, and a self-locking cover plate 102 is disposed on an upper part of the groove 101; the elastic member 2 is connected to a side wall of the groove 101; the elastic member 2 and another side wall of the groove 101 are configured to dispose an arch wire 3; the elastic member 2 is capable of elastically deforming under a squeezing action of the arch wire 3; and the elastic member 2 is capable of elastically deforming on a part close to a bottom surface of the groove 101 and a part away from the bottom surface of the groove 101, to elastically act on the arch wire 3 at different twist angles. In this solution, the elastic member 2 is designed to completely replace and change a problem of torque control on a rigid groove and a rigid arch wire of the self-locking bracket in the prior art, elastic control (as one side of the groove has elasticity) on a multi-angle torque of the arch wire 3 is implemented, a problem that stress on the tooth root is excessively concentrated during torque control on the arch wire 3 at different twist angles is radically resolved, a torque couple of the arch wire 3 is gently expressed, the tooth truly achieves an ideal torque, axial inclination, and position, and orthodontic treatment is safe and efficient.

In a preferable embodiment, the elastic member 2 is an elastic tube, the elastic tube is connected to the side wall of the groove 101, and the elastic tube 201 is capable of elastically deforming under squeezing of the arch wire. In this solution, the characteristic of a tubular structure can be utilized to achieve elastic deformation after squeezing, and the tubular structure is more stable and reliable, so that elastic restorability is stronger, and an elastic control capability on the arch wire 3 is stronger.

In a preferable embodiment, a clamping groove 103 is provided on the side wall of the groove 101, and the clamping groove 103 fits the elastic tube 201, so that an outer side wall of the elastic tube 201 is protruded from the clamping groove 103; and a deformation gap 104 is provided between an inner wall of the clamping groove 103 and the elastic tube 201, and the deformation gap 104 is used for allowing the elastic tube 201 to deform. In the solution in which the clamping groove is designed on the side wall of the groove for mounting the elastic tube in a fitting manner, the entire structure is simpler to produce and assemble, easier to implement, and controllable in cost. In addition, the position of the elastic tube can be kept to not change due to squeezing of the arch wire, and is always kept inside the clamping groove, to ensure an effective elastic effect and control on the arch wire.

In a preferable embodiment, as shown in FIG. 1, FIG. 4, FIG. 6, and FIG. 8, an axial direction of the elastic tube 201 is perpendicular to the bottom surface of the groove 101, and there is at least one elastic tube 201 in a direction parallel to the bottom surface of the groove 101. The axial direction of the elastic tube 201 is perpendicular to the bottom surface of the groove 101, so that the elastic deformation characteristic of any axial position of the elastic tube 201 can be sufficiently used to achieve torque control on the arch wire 3 at any angle. When the arch wire 3 twists at a clockwise or anticlockwise angle, the elastic tube 201 can be squeezed by the arch wire 3 to deform, so as to control an elastic acting force.

As shown in FIG. 11 and FIG. 12, when the arch wire twists, the arch wire can squeeze towards the elastic tube 201. The axial direction of the elastic tube is in a vertical direction. Regardless of a direction in which the arch wire twists, the elastic tube can deform under the corresponding stress to fully cover the squeezing of the arch wire, so that elastic deformation is fully covered, a controllable torque is really achieved, and an elastic acting force is precisely controlled.

It should be noted that, as shown in FIG. 12, the upper part of the elastic tube 201 is sealed and limited by the self-locking cover plate 102. When the self-locking cover plate 102 is at the maximum open position, the self-locking cover plate can still cover the elastic tube 201, to block and limit the elastic tube 201 from dropping out. This design is delicate, and the structure of the self-locking cover plate is reasonably utilized.

In a preferable embodiment, as shown in FIG. 10, the elastic tube 201 is provided with a cutting seam 2011, and the cutting seam 2011 is used to increase an elastic deformation capability of the elastic tube 201. The cutting seam 2011 is designed for making the elastic tube 201 to have a stronger deformation capability. After the elastic tube 201 is squeezed by the arch wire, the cutting seam 2011 can provide more deformation space, so that the elastic tube has a greater elastic control range, and stronger adaptability.

In a preferable embodiment, as shown in FIG. 1 and FIG. 4, there are two elastic tubes 201 which are distributed at two ends in the direction parallel to the bottom surface of the groove 101. In this solution, the two elastic tubes 201 can adapt to a functional need of the self-locking bracket corresponding to an incisor, so that the arch wire can be elastically controlled on opening positions on the two sides of the groove 101 to adapt to a torque change, on the incisor 7, of the arch wire 3.

In an alternative embodiment, as shown in FIG. 2 and FIG. 3, the axial direction of the elastic tube 201 is parallel to the bottom surface of the groove 101, and there is at least one elastic tube 201 in a direction perpendicular to the bottom surface of the groove 101. This solution is an alternative solution in which the axial direction of the elastic tube 101 is perpendicular to the bottom surface of the groove 201. In this solution, the axial direction of the elastic tube 201 is parallel to the bottom surface of the groove 101, so that an elastic force control effect on the elastic tube 201 can still be achieved, which may be lower in practical use, but is higher than that in the prior art. Therefore, a better elastic control capability can be achieved.

In a preferable embodiment, there are two elastic tubes 201 in the direction perpendicular to the bottom surface of the groove 101, and the two elastic tubes 201 are distributed at two ends in the direction perpendicular to the bottom surface of the groove 101. Similarly, the two elastic tubes 201 disposed in this solution can adapt to the functional need of the self-locking bracket corresponding to the incisor, so that the arch wire can be elastically controlled on opening positions on the two sides of the groove 101 to adapt to a torque change, on the incisor 7, of the arch wire 3.

In a preferable embodiment, a fixing part 105 is integrally formed on the side wall of the groove 101, and the fixing part 105 is provided with the clamping groove 103. The fixing part 105 in this solution is different from the self-locking bracket structure in the prior art, is a brand-new structural design, and is easy to produce. The clamping groove 103 is provided on the fixing part 105, so that the arch wire 3 can be stably mounted, and the structure is reasonable.

In a preferable embodiment, the fixing part 105 is integrally disposed, and the two ends of the fixing part 105 do not exceed two side end surfaces of the groove 101 in the direction parallel to the bottom surface of the groove 101. In this solution, the fixing part 105 can completely fit the elastic tube 201 to ensure that the elastic tube 201 can have an elastic acting force on the arch wire 3, and therefore, the two ends of the fixing part 105 need to be ensured to not exceed two side end surfaces of the groove 101. In addition, when there are two or more elastic tubes 201, the fixing part 105 can be disposed as an integrated structure, and is disposed on the side wall of the entire groove 101. Alternatively, the fixing part 105 may be disposed as a split structure, is disposed corresponding to the elastic tubes 201, and is distributed on the side wall of the groove 101.

In a preferable embodiment, the elastic tube 201 is a circular elastic tube. The circular tube structure is more stable and controllable, and is easier to process, produce, and mount.

As shown in FIG. 8, an orthodontic self-locking bracket system with a controllable arch wire torque includes an elastic tube 201 and further includes a plurality of brackets, where a groove 101 is provided in the bracket, an elastic tube 201 is disposed in the groove 101, and the bracket includes a first bracket 4, a second bracket 5, and a third bracket 6; there are two elastic tubes 201 of the first bracket 4 in a direction perpendicular to a bottom surface of the groove 101, and the two elastic tubes 201 are distributed on two sides in a direction parallel to the bottom surface of the groove 101; there is one elastic tube 201 of the second bracket 5 in the direction perpendicular to the bottom surface of the groove 101, and the one elastic tube 201 is distributed on one side of the groove 101 in the direction parallel to the bottom surface of the groove 101; there is one elastic tube 201 of the third bracket 6 in the direction perpendicular to the bottom surface of the groove 101, and the one elastic tube 201 is distributed in the middle of the groove 101 in the direction parallel to the bottom surface of the groove 101; and the first bracket 4 is disposed on an incisor 7, the second bracket 5 is disposed on a canine 8, the third bracket 6 is disposed on a front molar 9, and the first bracket 4, the second bracket 5, and the third bracket 6 are matched with each other, so that the arch wire 3 generates different orthodontic forces corresponding to different tooth parts. In this solution, the first bracket 4 is mounted on the incisor 7, the second bracket 5 is mounted on the canine 8, and the third bracket 6 is mounted on the front molar 9. Elastic tubes 201 of the first bracket 4, the second bracket 5, and the third bracket 6 are delicately and differently disposed, so that the arch wire 3 in the self-locking bracket system can generate different orthodontic forces on positions corresponding to different brackets, and therefore, torque applying on the incisor 7 does not need to be very precise. The elastic tube 201 of the first bracket 4 can ensure slow release of stress to avoid a negative effect as the stress in a root apex area is excessively absorbed. The second bracket 5 provides a movement clearance for the arch wire to approach to one side of the incisor 7, and therefore, deep overbite of the incisor 7 due to an axis of the canine 8 is not easily caused. Empty positions on two sides of the elastic tube 201 of the third bracket 6 can provide a movement clearance for the arch wire 3, so that the front molar 9 is unlikely to have mesial inclination to lead to an anchorage loss. When a chair arch wire is added, friction force between the chair arch wire and the third bracket 6 also can be reduced, to avoid a case in which an unrelated tooth moves due to an excessively large orthodontic force. The molar 10 is on the rear side of the front molar 9, and a buccal tube 11 is disposed on the molar 10 for locking the arch wire 3.

It should be noted that, although the orthodontic self-locking bracket system in this solution is applied to an upper-jaw tooth according to FIG. 8, a person of skill in the field can know that the system is also applicable to a low-jaw tooth. When the orthodontic self-locking bracket system in this solution is applied to the low-jaw tooth, the bracket disposed on the low-jaw incisor may be the first bracket 4 as the low-jaw incisor is smaller than the upper-jaw incisor. Alternatively, the current bracket structure without an elastic tube 201 structure be adopted. The bracket can be flexibly selected according to different orthodontic needs of the low-jaw tooth.

In a preferable embodiment, the second bracket 5 is disposed on the canine 8, and the side of the groove 101 without the elastic tube 201 is disposed facing the incisor 7 for the arch wire 3 to move. A movement clearance is provided for the side of the arch wire 3 facing the incisor 7 according to the structural change of the second bracket 5, so that an extra pulling force of the arch wire 3 on the incisor 7 is reduced, and a downwards ineffective pulling force of the arch wire 3 on the incisor 7 can be timely eliminated. This prevents the incisor 7 from being pulled outwards, and avoids overbite of the incisor 7.

In a preferable embodiment, there are two front molars 9 on a same side of the tooth. After one front molar 9 is extracted, the third bracket 6 is disposed on the other front molar 9 that is not extracted. The empty positions on two sides of the elastic tube 201 of the third bracket 6 are used to reduce friction force generated between the chair arch wire and the third bracket 6. In this embodiment, during tooth extraction, the front molar 9 is firstly extracted to form a gap through which a dentition is aligned and an anterior tooth is retracted. Therefore, after one front molar 9 is extracted, the chair arch wire is added into the groove 101 of the bracket. The chair arch wire refers to a special arch wire form that is added at a dental suture stage in the dental orthodontic field. The arch wire may be bent to pull and move teeth on the two sides of a gap between teeth. The empty positions on the two sides of the elastic tube 201 of the third bracket 6 provide movement clearances for the chair arch wire, so that invalid friction force generated between the bent position of the chair arch wire and the third bracket 6 can be effectively reduced, the orthodontic force generated by the arch wire of the entire system is reduced, and the unrelated tooth is prevented from moving.

In a preferable embodiment, as shown in FIG. 4, the fixing part 105 of the first bracket 4 can be continuously and integrally disposed along the side wall of the groove 101.

In a preferable embodiment, as shown in FIG. 6, the second bracket 5 is provided with a single-sided notch 501. The single-sided notch 501 corresponds to a side wall of the groove 101 not filled up with the fixing part 105. To prevent the arch wire 3 from losing original orthodontic force in the second bracket 5, a maximum size of the single-sided notch 501 is limited: in a length direction of the groove 101, the size of the single-sided notch 501 of the second bracket 5 is less than or equal to 60% of a length size of the entire groove 101.

Preferably, there are two elastic tubes 201 in FIG. 6 for providing more stable and stable elastic control on the arch wire 3.

In a preferable embodiment, as shown in FIG. 7, the third bracket 6 is provided with a double-sided notch 601. The double-sided notch 601 corresponds to a side wall of the groove 101 not filled up with the fixing part 105. To prevent the arch wire from losing original orthodontic force due to the excessively large size of the double-sided notch 601 of the third bracket 6, a maximum size of the double-sided notch 601 is limited: in the length direction of the groove 101, the size of any double-sided notch 601 is less than or equal to 30% of a length size of the entire groove 101.

Preferably, there are two elastic tubes 201 in FIG. 7 for providing more stable and stable elastic control on the arch wire 3.

In a preferable embodiment, to avoid a case in which the friction force cannot be reduced as the movement clearance of the arch wire is insufficient due to an excessively small size of the single-sided notch 501 of the second bracket 5, a minimum size of the single-sided notch 501 is limited: in the length direction of the groove 101, the size of the single-sided notch 501 of the second bracket 5 is greater than 10% of the size of the entire groove.

In a preferable embodiment, to avoid a case in which the friction force cannot be reduced as the movement clearance of the arch wire 3 is insufficient due to an excessively small size of the double-sided notch 601 of the third bracket 6, a minimum size of the double-sided notch 601 is limited: in the length direction of the groove 101, the size of any doubled-sided notch 601 is greater than 5% of the size of the entire groove 101.

The specific implementations cannot be used as limitations on the protection range of the present invention. For a person of skill in the art, any alternative improvement or modification made to the implementations of the present invention shall fall within the protection range of the present invention.

A part that is not described in detail in the present invention is the prior art for a person of skill in the art.

The invention claimed is:

1. An orthodontic bracket with a controllable arch wire torque, comprising:
   a bracket body, and
   a hollow elastic tube, wherein:
   a groove is provided in the bracket body
   the elastic tube is connected to a side wall of the groove;
   the elastic tube and another side wall of the groove are configured to accommodate an arch wire;
   the elastic tube is capable of elastically deforming under a squeezing action of the arch wire; and
   the elastic tube is capable of elastically deforming on a part close to a bottom surface of the groove and a part away from the bottom surface of the groove, to elastically act on the arch wire at different twist angles.

2. The orthodontic bracket with a controllable arch wire torque according to claim 1, wherein a clamping groove is provided on the side wall of the groove, and the clamping groove fits the elastic tube, so that an outer side wall of the elastic tube is protruded from the clamping groove; and a deformation gap is provided between an inner wall of the clamping groove and the elastic tube, and the deformation gap is used for allowing the elastic tube to deform.

3. The orthodontic bracket with a controllable arch wire torque according to claim 2, wherein a fixing part is integrally formed on the side wall of the groove, and the fixing part is provided with the clamping groove.

4. The orthodontic bracket with a controllable arch wire torque according to claim 1, wherein a longitudinal axis direction of the elastic tube is perpendicular to the bottom surface of the groove.

5. The orthodontic bracket with a controllable arch wire torque according to claim 4, wherein the elastic tube comprises two elastic tubes which are distributed at two ends in a direction parallel to the bottom surface of the groove.

6. The orthodontic bracket with a controllable arch wire torque according to claim 1, wherein a longitudinal axis direction of the elastic tube is parallel to the bottom surface of the groove.

7. The orthodontics bracket with a controllable arch wire torque according to claim 6, wherein the elastic tube comprises two elastic tubes, and the two elastic tubes are distributed at two ends in a direction perpendicular to the bottom surface of the groove.

8. The orthodontics locking bracket with a controllable arch wire torque according to claim 1, wherein the elastic tube is provided with a cutting seam, and the cutting seam is used to increase an elastic deformation capability of the elastic tube.

9. An orthodontic bracket system with a controllable arch wire torque, comprising the elastic tube according to claim 1, and further comprising a plurality of brackets, wherein a groove is provided in the bracket, an elastic tube is disposed in the groove, and the plurality of brackets comprises a first bracket, a second bracket, and a third bracket;
   there are two elastic tubes of the first bracket in a direction perpendicular to a bottom surface of the groove, and the two elastic tubes are distributed on two sides in a direction parallel to the bottom surface of the groove;
   there is one elastic tube of the second bracket in the direction perpendicular to the bottom surface of the groove, and the one elastic tube is distributed on one side of the groove in the direction parallel to the bottom surface of the groove;
   there is one elastic tube of the third bracket in the direction perpendicular to the bottom surface of the groove, and the one elastic tube is distributed in the middle of the groove in the direction parallel to the bottom surface of the groove; and
   the first bracket is disposed on an incisor, the second bracket is disposed on a canine, the third bracket is disposed on a front molar, and the first bracket, the second bracket, and the third bracket are matched with each other, so that the arch wire generates different orthodontic forces corresponding to different tooth parts.

10. The orthodontic bracket with a controllable arch wire torque according to claim 1, wherein a cover plate covers an upper part of the groove.

11. The orthodontic bracket with a controllable arch wire torque according to claim 10, wherein the cover plate is movable between a maximum open position and a closed position, and in both the closed position and the maximum open position, the cover plate covers the elastic tube and blocks the elastic tube from dropping out of the orthodontic bracket.

12. An orthodontic bracket with a controllable arch wire torque, comprising:
   a bracket body; and
   an elastic member, wherein:
   a groove is provided in the bracket body;
   the elastic member is connected to a side wall of the groove;
   the elastic member and another side wall of the groove are configured to accommodate an arch wire;
   the elastic member is capable of elastically deforming under a squeezing action of the arch wire;
   the elastic member is capable of elastically deforming on a part close to a bottom surface of the groove and a part away from the bottom surface of the groove, to elastically act on the arch wire at different twist angles; and
   a longitudinal axis direction of the elastic member is perpendicular to the bottom surface of the groove.

13. The orthodontic bracket with a controllable arch wire torque according to claim 12, wherein the elastic member comprises two elastic members which are distributed at two ends in a direction parallel to the bottom surface of the groove.

14. An orthodontic bracket with a controllable arch wire torque, comprising:
   a bracket body; and
   two elastic members, wherein:
   a groove is provided in the bracket body;

the two elastic members are distributed at two ends in a direction perpendicular to the bottom surface of the groove, each elastic member being connected to a side wall of the groove;

the elastic members and another side wall of the groove are configured to accommodate an arch wire;

the elastic members are capable of elastically deforming under a squeezing action of the arch wire;

the elastic members are capable of elastically deforming on a part close to a bottom surface of the groove and a part away from the bottom surface of the groove, to elastically act on the arch wire at different twist angles; and a longitudinal axis direction of each elastic member is parallel to the bottom surface of the groove.

* * * * *